(12) United States Patent
Ranjan et al.

(10) Patent No.: US 11,968,098 B1
(45) Date of Patent: Apr. 23, 2024

(54) AUTOMATED DATA BACKFILLING FOR NETWORK DATA PROCESSING

(71) Applicant: T-Mobile Innovations LLC, Overland Park, KS (US)

(72) Inventors: Vikas Ranjan, Bellevue, WA (US); Raymond Wu, Newcastle, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/194,434

(22) Filed: Mar. 31, 2023

(51) Int. Cl.
*H04L 41/5009* (2022.01)
*H04L 41/06* (2022.01)

(52) U.S. Cl.
CPC .......... *H04L 41/5009* (2013.01); *H04L 41/06* (2013.01)

(58) Field of Classification Search
CPC .... H04L 41/5009; H04L 41/16; H04W 24/10; H04W 24/08; H04W 24/02
See application file for complete search history.

(56) References Cited

U.S. PATENT DOCUMENTS

| | | | | |
|---|---|---|---|---|
| 10,146,609 | B1* | 12/2018 | Leverich | G06F 11/079 |
| 2004/0199918 | A1* | 10/2004 | Skovira | G06F 9/5038 |
| | | | | 718/102 |
| 2013/0107764 | A1* | 5/2013 | Zeger | H04L 5/16 |
| | | | | 370/280 |
| 2013/0324104 | A1* | 12/2013 | Cavilla | H04W 72/569 |
| | | | | 455/422.1 |
| 2021/0224699 | A1* | 7/2021 | Soundrarajan | H04L 41/145 |
| 2022/0210682 | A1* | 6/2022 | Kulkarni | H04W 24/10 |
| 2023/0156030 | A1* | 5/2023 | Bassi | H04L 63/1425 |
| | | | | 726/25 |
| 2023/0408985 | A1* | 12/2023 | Nordh | G05B 13/027 |

OTHER PUBLICATIONS

Lagar-Cavilla; Traffic Backfilling: Subsidizing Lunch for Delay-Tolerant Applications in UMTS Networks; Oct. 23, 2011; ACM; pp. 1-5. (Year: 2011).*

* cited by examiner

*Primary Examiner* — Muhammad Raza

(57) ABSTRACT

A method of initiating a KPI backfill operation for a cellular network based on detecting a network data anomaly, where the method includes receiving, by an anomaly detection and backfill engine (ADBE) executed by a computing device, a data quality metric that is based on a KPI of the cellular network; detecting, by the ADBE, the network data anomaly based on the data quality metric being more than a threshold amount different than a predicted value for the data quality metric, where the network data anomaly indicates that at least a portion of a data stream from which the KPI is calculated was unavailable for a previous iteration of the KPI; and providing, by the ADBE and based on detecting the network data anomaly, a backfill command to a backfill processing pipeline to perform the backfill operation by reaggregating the KPI when the portion of the data stream becomes available.

12 Claims, 5 Drawing Sheets

200

202 — Receiving, by an ADBE executed by a computing device, a data quality metric that is based on a KPI of the cellular network 204 — Detecting, by the ADBE, the network data anomaly based on the data quality metric being more than a threshold amount different than a predicted value for the data quality metric, where the network data anomaly indicates that at least a portion of a data stream from which the KPI is calculated was unavailable for a previous iteration of the KPI 206 — Providing, by the ADBE and based on detecting the network data anomaly, a backfill command to a backfill processing pipeline to perform the backfill operation by reaggregating the KPI when the portion of the data stream becomes available

AUTOMATED DATA BACKFILLING FOR NETWORK DATA PROCESSING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Cellular network providers aggregate key performance indicators (KPIs) that are indicative of various aspects of cellular network performance. Such KPIs may be useful to provide insights into network performance that impacts consumer satisfaction, to satisfy regulatory requirements (e.g., imposed by the Federal Communications Commission (FCC)) for common carrier networks, and the like.

SUMMARY

In an embodiment, a method of initiating a KPI backfill operation for a cellular network based on detecting a network data anomaly includes receiving, by an anomaly detection and backfill engine (ADBE) executed by a computing device, a data quality metric that is based on a KPI of the cellular network; detecting, by the ADBE, the network data anomaly based on the data quality metric being more than a threshold amount different than a predicted value for the data quality metric, where the network data anomaly indicates that at least a portion of a data stream from which the KPI is calculated was unavailable for a previous iteration of the KPI; and providing, by the ADBE and based on detecting the network data anomaly, a backfill command to a backfill processing pipeline to perform the backfill operation by reaggregating the KPI when the portion of the data stream becomes available.

In another embodiment, a system for initiating a KPI backfill operation for a cellular network based on detecting a network data anomaly includes a processor, a non-transitory memory coupled to the processor, and an anomaly detection and backfill engine (ADBE) stored in the non-transitory memory. The ADBE, when executed by the processor, is configured to receive a data stream from which a KPI of the cellular network is calculated; detect the network data anomaly based on a received quantity of the data stream being less than a threshold amount for the data stream, where the network data anomaly indicates that at least a portion of the data stream was unavailable for a previous iteration of the KPI; and provide, based on detecting the network data anomaly, a backfill command to a backfill processing pipeline to perform the backfill operation by reaggregating the KPI when the portion of the data stream becomes available.

In yet another embodiment, a non-transitory computer-readable medium contains instructions that, when executed by a processor of an electronic device, cause the electronic device to be configured to receive a data quality metric that is based on a KPI of a cellular network; detect a network data anomaly based on the data quality metric being more than a threshold amount different than a predicted value for the data quality metric, where the network data anomaly indicates that at least a portion of a data stream from which the KPI is calculated was unavailable for a previous iteration of the KPI; and provide, based on detecting the network data anomaly, a backfill command to a backfill processing pipeline to perform a KPI backfill operation by reaggregating the KPI when the portion of the data stream becomes available.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
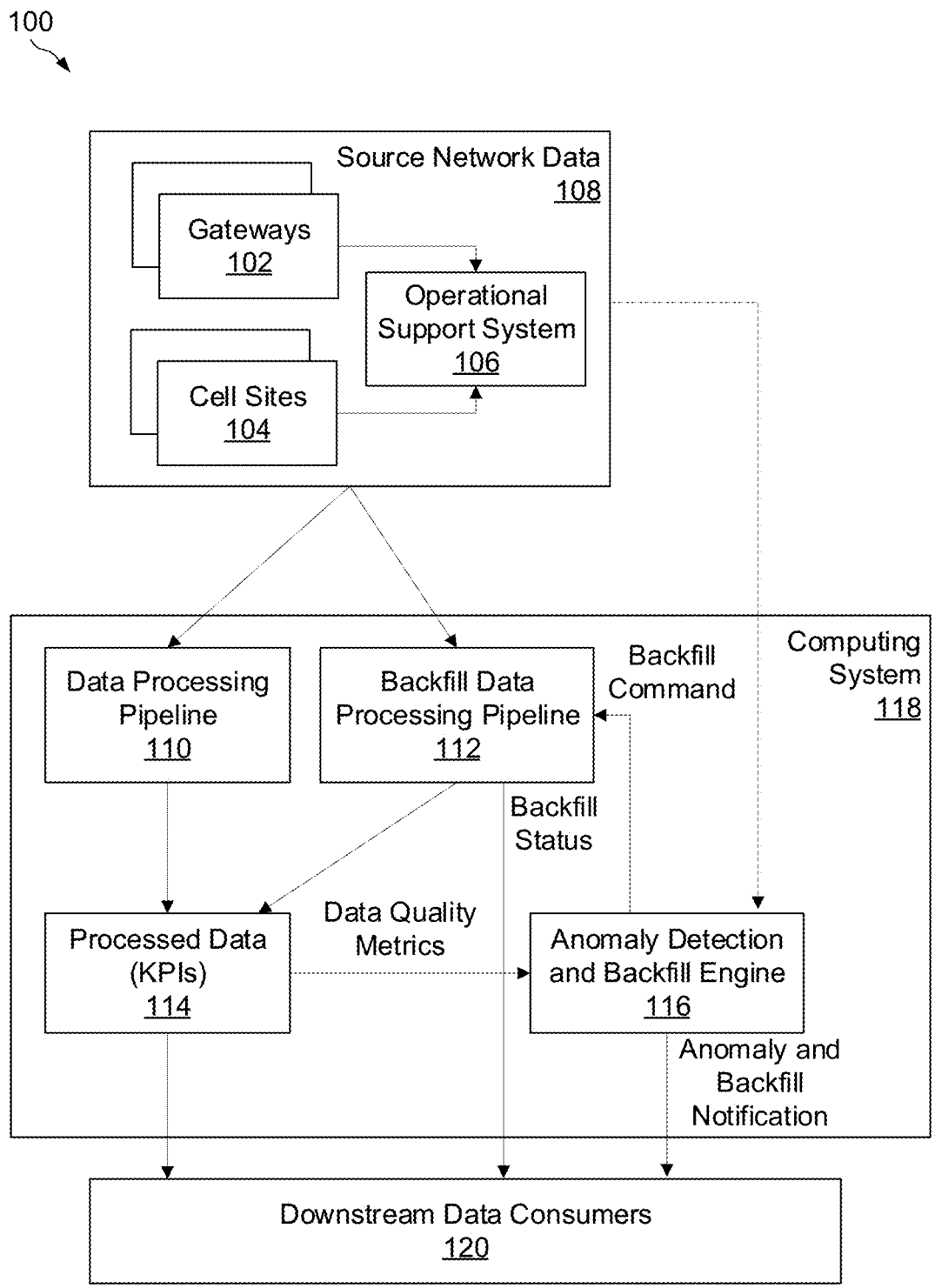
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

It can be useful for a cellular network provider to provide or otherwise make available key performance indicators (KPIs) for its downstream data consumers (e.g., internal users including network engineering teams, customer support, digital and other marketing teams, senior leadership teams, and the like). Various network elements of the cellular network (e.g., gateways, access nodes including cell sites, and the like) may generate raw data, which is provided to one or more operational support systems (OSSes). The raw data may include call data record (CDR) data, event data record (EDR) data, per call measurement data (PCMD), location session record (LSR) data, among other types of data typically generated by these network elements. This data may be referred to as source network data for generality.

A computing device of the cellular network is configured to implement a data processing pipeline to aggregate the source network data (e.g., received from the OSS(es)) into one or more KPIs of the network. The KPIs may be generally related to network coverage, network usage, network downtime, or the like. For example, KPIs may include statistical data related to quantities of dropped calls, delay times when placing a call, when/where/how a subscriber loses coverage, and other indications of network performance.

However, data on which a KPI is based may be delayed or otherwise unavailable at the time at which the KPI is aggregated, which results in an inaccurate or incomplete KPI. For example, data from the OSS(es) on which a KPI is based may be delayed, partially missing, or otherwise unavailable at the time at which the KPI is aggregated, which results in an inaccurate or incomplete KPI. For example, an OSS may experience down time, such as due to a planned event such as a server maintenance operation, or due to an unplanned event such as a device/server outage. In either event, the stream of network data provided by the OSS to the data processing pipeline that aggregates the KPI based on the network data is delayed or interrupted.

For the sake of generality, a network data anomaly refers to such a delay in, or unavailability of, the source network data from one or more OSSes to the data processing pipeline that aggregates KPI(s) based on that network data. In the event of a network data anomaly, a backfilling operation should be performed to reaggregate or otherwise recalculate the KPI(s) affected by the network data anomaly (e.g., the KPIs that are based on the delayed or otherwise unavailable data stream(s)). For example, once the delayed data is received, the affected KPI(s) are properly calculated, taking the delayed data into account.

However, it can be difficult to manually detect an occurrence of such a network data anomaly. For example, due to the scale of a cellular network and the relatively large number of sources of network data that feed into calculating one or more KPI(s), it may be difficult to identify that a particular type of data from a particular OSS is not arriving in an expected, timely manner. In some cases, the network data anomaly may not even be detected until a KPI consumer (e.g., a party, such as a customer of the cellular network provider, who receives and utilizes the KPI(s) in question, or a customer care group for use in troubleshooting when interacting with a cellular network customer having issues with the cellular network or devices coupled thereto) observes a KPI that appears anomalous, has a value outside of an expected range (or exceeding an expected threshold), or the like. It is disadvantageous to the cellular network provider to have a network data anomaly be detected by one of its KPI consumers, from both a reputational standpoint, as well as providing a recalculated KPI well after an erroneous KPI has been provided to its customer.

To address the foregoing, embodiments of this disclosure include methods and systems for initiating a KPI backfill operation for a cellular network based on detecting a network data anomaly. In particular, an anomaly detection and backfill engine (ADBE) comprises software that is executable by a computing device (e.g., by a processor thereof) and is configured to receive data quality metrics that are based on KPI(s) of the cellular network. Examples of such data quality metrics include total daily duration of no coverage events in a market or hourly unique International Mobile Subscriber Identity (IMSI) count in a market. These data quality metrics may indicate or otherwise reflect a network data anomaly in one or more of the underlying streams of network data on which the KPI(s) are based (e.g., CDR data, EDR data, PCMD, LSR data, and the like). For example, when a stream of network data provided by the OSS, on which a particular KPI is based, is delayed or interrupted, the data quality metric that is derived or calculated based on the particular KPI changes in a way that is detectable by the ADBE as indicative of the network data anomaly.

In some examples, the ADBE includes an artificial intelligence/machine learning AI/ML engine, which may be trained to detect a deviation of a data quality metric from a predicted or expected value for the data quality metric by more than a threshold amount. For example, the machine learning engine may be fed historical data (e.g., a time series of previous data quality metric values) that are based on properly-aggregated values of the particular KPI(s) on which the data quality metric is based. That is, the historical data quality metric data are calculated in situations in which the underlying stream of network data provided by the OSS is available and not delayed, and thus no network data anomaly occurs. The AI/ML engine may be developed and trained as self-learning, so that it is able to work with trend changes and seasonality in addition to spikes and dips in the analyzed data.

When the AI/ML engine is sufficiently trained on historical data, the ADBE is thus configured to detect the network data anomaly based on the received data quality metric being more than a threshold amount different than the predicted value for that data quality metric. In some examples, the ADBE monitors multiple data quality metrics, and each is compared to its own predicted value. As one example, the ADBE receives a first data quality metric and a second data quality metric (or first and second time series thereof). The ADBE is configured to compare the first data quality metric to a predicted value for the first data quality metric, and to determine whether the first data quality metric deviates from the predicted value for the first data quality metric by more than a first threshold amount. The ADBE is also configured to compare the second data quality metric to a predicted value for the second data quality metric, and to determine whether the second data quality metric deviates from the predicted value for the second data quality metric by more than a second threshold amount. The second threshold amount may be different than the first threshold amount in some cases.

The ADBE detects a network data anomaly when the data quality metric is more than the threshold amount from the expected or predicted value for the data quality metric. In examples in which multiple data quality metrics are compared to corresponding expected or predicted values, the ADBE may detect a network data anomaly based on various logical combinations. For example, a network data anomaly may be detected when each of the data quality metrics is more than its respective threshold amount from its respective expected or predicted value. In another example, a network data anomaly may be detected when any of the data quality metrics is more than its respective threshold amount from its respective expected or predicted value. Other such logical combinations may be possible, and the scope of the present disclosure is not limited to a particular logical combination unless specifically stated.

The ADBE may also be configured to receive a data stream from which a KPI of the cellular network is calculated (e.g., the source network data from one or more OSSes that is used by the data processing pipeline to aggregate KPI(s)). In some examples, the ADBE is configured to detect the network data anomaly based on a received quantity of the data stream being less than a threshold amount for the data stream. For example, there may be less data points or data samples provided in the data stream than is usual (e.g., less than a minimum threshold number of data points or data samples—where the threshold number of data points or data samples may be 75% of an average number of like data points or data samples per relevant period of time, or some other fraction less than 100%). That is, there is a shortfall in the received quantity of the data stream relative to an expected or predetermined amount. For example, a particular KPI may be aggregated or otherwise calculated on a periodic or somewhat-regular basis, such as daily. Continuing this example, an amount or quantity of the data stream is understood to be at least a threshold amount per day. Thus, when the data stream (e.g., the stream of network data provided by the OSS) on which the particular KPI is based is delayed or otherwise interrupted, the received quantity of the data stream will be less than the expected threshold amount for that iteration of aggregating the KPI. In one non-limiting example, the shortfall may be characterized by the received quantity of the data stream being less than the threshold amount described above. The threshold amount may be a predefined threshold, such as a certain amount of data stream values in a given time period. The threshold amount may be defined on a per-OSS basis, in which different OSSes are expected to stream different quantities of data and accordingly have different respective thresholds. Regardless of the particular threshold implementation, a shortfall in the received quantity of the data stream (e.g., being less than the threshold amount for that data stream) is detectable by the ADBE as indicative of the network data anomaly.

Irrespective of how the network data anomaly is detected by the ADBE, the network data anomaly indicates that at least a portion of a network data stream from which the KPI is calculated was unavailable (e.g., delayed) when a previous iteration of the KPI was calculated or aggregated. As described above, in the event of a network data anomaly, a backfilling operation should be performed to reaggregate or otherwise recalculate the KPI(s) affected by the network data anomaly (e.g., the KPIs that are based on the delayed or otherwise unavailable data stream(s)). For example, once the delayed data is received, the affected KPI(s) are properly calculated, taking the delayed data into account.

Accordingly, the ADBE is also configured to provide (e.g., based on detecting the network data anomaly) a backfill command to a backfill processing pipeline. The backfill processing pipeline may be in parallel with the data processing pipeline that aggregates KPI(s) based on network data from the OSS(es), which enables a backfill operation to be performed in parallel with standard aggregation of KPIs based on current network data from the OSS(es). The backfill command is configured to cause the backfill processing pipeline to perform a KPI backfill operation by reaggregating the KPI when the portion of the data stream becomes unavailable.

In this way, when a network data anomaly is detected by the ADBE, particular attention may be directed to the network data stream that is indicated by the detected network data anomaly as having been unavailable when the previous iteration of the KPI was aggregated. This enables the ADBE and the backfill processing pipeline to work in conjunction to wait for the data to arrive (e.g., where the network data anomaly indicates the data stream is delayed), or to wait for the data to be complete (e.g., where the network data anomaly indicates the data available from the data stream is only partial data, or that expected data is missing). Responsive to the portion of the data stream becoming available, the KPI is reaggregated during the backfilling operation.

In some examples, the ADBE may be configured to provide a notification of the detected network data anomaly, and that a backfill command has been initiated (e.g., irrespective of whether the backfill operation has necessarily begun, and/or is complete), to a downstream consumer of the KPI to be reaggregated based on the backfill command. Similarly, the backfill processing pipeline may be configured to provide a status of the backfill operation to the downstream consumer of the KPI being reaggregated during the backfill operation. In this way, the downstream consumer of the KPI is kept up-to-date and is aware of the fact that the previous iteration of the KPI may be erroneous (e.g., due to being based on delayed and/or unavailable network data), and that a reaggregated iteration of the KPI will be provided once the backfill operation is complete.

In some examples, the cellular network may include multiple regions (e.g., geographic regions), and KPIs for the cellular network may be aggregated at a regional level, a multi-regional level (e.g., including more than one region, but less than all regions in the cellular network), or a global level (e.g., including all regions in the cellular network). However, the ADBE may detect that the portion of the data stream that was unavailable for the previous iteration of a particular KPI (e.g., the portion of the underlying network data indicated by the detected network data anomaly) was associated with a particular region, or regions of the cellular network, but was not a global data stream (e.g., associated with all regions of the cellular network). Accordingly, in such cases, the ADBE may be configured to provide the backfill command such that the specified backfill operation is to reaggregate the particular KPI only for the particular region(s) that are affected by the network data anomaly. For example, if the network data anomaly is caused by delayed data from Region A, while the previous iteration of the KPI was aggregated for Regions A, B, and C, the backfill command may specify a backfill operation to reaggregate the KPI for only Region A. As another example, if the network data anomaly is caused by delayed data from Regions A and B, while the previous iteration of the KPI was aggregated for Regions A, B, and C, the backfill command may specify a backfill operation to reaggregate the KPI for only Regions A and B.

This improved granularity of awareness of which region (s) are impacted by the network data anomaly enables the reaggregation of the KPI to be more region-specific, and may avoid the need to reaggregate the KPI on a global level, which may be more computationally intensive than reaggregating the KPI on a regional or multi-regional level. Thus, at least in some cases, an amount of processing time to reaggregate the KPI only for the particular region of the cellular network is less than an amount of processing time to reaggregate the KPI for greater than the particular region (e.g., on a global level).

Turning now to FIG. 1, a system 100 is described in accordance with embodiments of this disclosure. While a particular system 100 architecture is described with respect to FIG. 1, other architectures are also consistent with the teachings of this disclosure. Some components that are described as separate may be combined into a single component, and some components described as single components may be partitioned into two or more components in their own right.

The system 100 includes exemplary elements of a cellular network, such as gateways 102 and cell sites 104 (e.g., access nodes). Other elements of a cellular network may be present in the system 100, but are not shown for the sake of brevity. Irrespective of the particular elements 102, 104 of the cellular network present in the system 100, these elements may generate raw data, which is provided to one or more operational support systems (OSSes) 106. The raw data may include CDR data, EDR data, PCMD, and LSR data, among other types of data typically generated by these network elements 102, 104. In FIG. 1, this data is depicted as source network data 108 for generality.

The system 100 also includes a data processing pipeline 110 and a backfill data processing pipeline 112 (a backfill data processing pipeline 112, for brevity), both of which are configured to receive the source network data 108 and provide KPIs (e.g., based on the source network data 108) to a processed data storage 114, or KPI storage 114 for simplicity. The system 100 also includes anomaly detection and backfill engine (ADBE) 116. The data processing pipeline 110, backfill data processing pipeline 112, KPI storage 114, and ADBE 116 are depicted as part of a computing system 118, which thus implements the various functionality of these elements described herein. It should be understood that the computing system 118 is shown as a single element in FIG. 1 for simplicity, but in other examples, various ones of the data processing pipeline 110, backfill data processing pipeline 112, KPIs 114 (or storage thereof), and ADBE 116 may be implemented by separate computing devices (e.g., executed by processors thereof to provide the functionality described herein). That is, computing system 118 can be implemented as one or more computers, and the functions of those computers are described further below. In some examples, the computing system 118 (or portions thereof) may be implemented by a cloud computing environment.

The system 100 also includes downstream data consumers 120, which are also referred to as downstream KPI consumers 120. These downstream KPI consumers 120 may receive KPIs from the KPI storage 114, along with various notifications and status updates, described further below.

As described above, it is useful for a cellular network provider to provide KPIs to the downstream KPI consumers 120. The data processing pipeline 110 and backfill data processing pipeline 112 may be software that is executed by the computing system 118 (or separate computing devices) to aggregate the source network data 108 (e.g., received from the OSS(es) 106) into one or more KPIs of the cellular network. The data processing pipeline 110 and/or the backfill data processing pipeline 112 provide their KPIs to the KPI storage 114, which may comprise volatile memory, non-volatile memory, or combinations thereof. As described, the KPIs stored in KPI storage 114 may be generally related to network coverage, network usage, network downtime, or the like. For example, KPIs may include statistical data related to quantities of dropped calls, delay times when placing a call, and other indications of network performance.

The ADBE 116, which may also be software that is executed by the computing system 118 (or a separate computing device), is configured to receive data quality metrics that are based on one or more KPIs in the KPI storage 114. The data quality metrics may be generated by the data processing pipeline 110 and/or the backfill data pipeline 112 when aggregating the KPIs, or may be generated by another process (not shown for simplicity) after the KPIs are stored in the KPI storage 114. Irrespective of how the data quality metrics are produced, the data quality metrics are provided to the ADBE 116 as shown.

In some cases, at the time that the data processing pipeline 110 aggregates a particular KPI based on the source network data 108, a portion thereof is delayed or otherwise unavailable. For example, the OSS 106 may experience down time, such as due to a planned event such as a server maintenance operation, or due to an unplanned event such as a device/ server outage. In either event, the source network data 108 provided by the OSS 106 includes a stream of network data that is delayed or interrupted.

The data quality metrics provided to the ADBE 116 may indicate or otherwise reflect a network data anomaly in one or more of the underlying streams of network data that comprise the source network data 108 on which the KPI(s) are based (e.g., CDR data, EDR data, PCMD, LSR data, and the like). For example, when a stream of network data provided by the OSS 106, on which a particular KPI is based, is delayed or interrupted, the data quality metric that is derived or calculated based on the particular KPI changes in a way that is detectable by the ADBE 116 as indicative of the network data anomaly.

As described, the ADBE 116 may include an AI/ML engine, which may be trained to detect a deviation of a data quality metric from a predicted or expected value for the data quality metric by more than a threshold amount. For example, the AI/ML engine may be fed historical data (e.g., a time series of previous data quality metric values) that are based on properly-aggregated values of the particular KPI(s) on which the data quality metric is based. That is, the historical data quality metric data are calculated in situations in which the underlying stream of network data provided by the OSS 106 is available and not delayed, and thus no network data anomaly occurs.

The ADBE 116 is configured to detect the network data anomaly based on the received data quality metric being more than a threshold amount different than the predicted value for that data quality metric. In some examples, the ADBE 116 monitors multiple data quality metrics, and each is compared to its own predicted value. As one example, the ADBE 116 receives a first data quality metric and a second data quality metric (or first and second time series thereof). The ADBE 116 is configured to compare the first data quality metric to a predicted value for the first data quality metric, and to determine whether the first data quality metric deviates from the predicted value for the first data quality metric by more than a first threshold amount. The ADBE 116 is also configured to compare the second data quality metric to a predicted value for the second data quality metric, and to determine whether the second data quality metric deviates from the predicted value for the second data quality metric by more than a second threshold amount. The second threshold amount may be different than the first threshold amount in some cases. In this example, the ADBE 116 thus detects a network data anomaly when the data quality metric is more than the threshold amount from the expected or predicted value for the data quality metric.

In another example, the ADBE 116 may be additionally or alternatively configured to receive a data stream from which a KPI of the cellular network is calculated (e.g., the source network data 108 from one or more OSSes 106 that is used by the data processing pipeline 110 to aggregate KPI(s)). In this example, the ADBE 116 is configured to detect the network data anomaly based on a received quantity of the data stream being less than a threshold amount for the data stream. For example, a particular KPI may be aggregated or otherwise calculated on a periodic or somewhat-regular basis, such as daily. Continuing this example, an amount or quantity of the data stream is understood to be at least a threshold amount per day. Thus, when the data stream (e.g., the stream of network data provided by the OSS 106) on which the particular KPI is based is delayed or otherwise interrupted, the received quantity of the data stream will be less than the expected threshold amount for that iteration of aggregating the KPI. Accordingly, the received quantity of the data stream being less than the threshold amount for that data stream is detectable by the ADBE 116 as indicative of the network data anomaly.

Similar to above regarding monitoring multiple data quality metrics, the ADBE 116 may also be configured to monitor multiple data streams as part of the source network data 118, and a received quantity of each data stream is compared to its threshold amount expected for a particular time period. As one example, the ADBE 116 receives a first data stream and a second data stream (or first and second time series thereof). The ADBE 116 is configured to compare a received amount of the first data stream to a first threshold amount for the first data stream, and to determine whether the received amount of the first data stream is less than the first threshold amount. The ADBE 116 is also configured to compare a received amount of the second data stream to a second threshold amount for the second data stream, and to determine whether the received amount of the second data stream is less than the second threshold amount. The second threshold amount may be different than the first threshold amount in some cases.

Irrespective of how the network data anomaly is detected by the ADBE 116, the ADBE 116 detecting the network data anomaly indicates that at least a portion of a network data stream from which the KPI is calculated (e.g., source network data 108) was unavailable (e.g., delayed) when a previous iteration of the KPI was calculated or aggregated. As described above, in the event of a network data anomaly, a backfilling operation should be performed by the backfill data processing pipeline 112 to reaggregate or otherwise recalculate the KPI(s) affected by the network data anomaly (e.g., the KPIs that are based on the delayed or otherwise unavailable data stream(s)). For example, once the delayed data is received, the backfill data processing pipeline 112 is configured to reaggregate the affected KPI(s), taking the delayed data into account.

Accordingly, the ADBE 116 is also configured to provide (e.g., based on detecting the network data anomaly) a backfill command to the backfill data processing pipeline 112. As described above, the backfill data processing pipeline 112 is able to function in parallel with the data processing pipeline 110, so that each may aggregate KPI(s) based on source network data 108 from the OSS(es) 106 at the same time. This enables a backfill operation to be performed in parallel with standard aggregation of KPIs based on current network data from the OSS(es) 106. The backfill command is configured to cause the backfill data processing pipeline 112 to perform a KPI backfill operation by reaggregating the KPI when the portion of the data stream becomes unavailable.

Thus, when the ADBE 116 detects a network data anomaly, the backfill data processing pipeline 112 is notified by the backfill command, and the ADBE 116 and backfill data processing pipeline 112 work in conjunction to wait for the missing data to arrive (e.g., from the OSS 106), at which point the backfill data processing pipeline 112 reaggregates the KPI that was affected by the detected network data anomaly.

The ADBE 116 may also provide a notification of the detected network data anomaly, and that a backfill command has been initiated (e.g., irrespective of whether the backfill operation has necessarily begun, and/or is complete), to the downstream KPI consumer 120. The backfill data processing pipeline 112 may also provide a status of the backfill operation to the downstream KPI consumer 120. In this way, the downstream KPI consumer 120 is kept up-to-date and is aware of the fact that the previous iteration of the KPI may be erroneous (e.g., due to being based on delayed and/or unavailable network data), and that a reaggregated iteration of the KPI will be provided once the backfill operation is complete.

In some examples, the cellular network (e.g., gateways 102, cell sites 104, and/or other network elements) may include multiple regions (e.g., geographic regions), and KPIs for the cellular network may be aggregated at a regional level, a multi-regional level (e.g., including more than one region, but less than all regions in the cellular network), or a global level (e.g., including all regions in the cellular network). However, the ADBE 116 may detect that the portion of the data stream that was unavailable for the previous iteration of a particular KPI (e.g., the portion of the underlying network data indicated by the detected network data anomaly) was associated with a particular region, or regions of the cellular network, but was not a global data stream (e.g., associated with all regions of the cellular network).

In such cases, the ADBE 116 may be configured to provide the backfill command to the backfill data processing pipeline 112 such that the specified backfill operation is to reaggregate the particular KPI only for the particular region (s) that are affected by the network data anomaly. For example, if the network data anomaly is caused by delayed data from Region A, while the previous iteration of the KPI was aggregated for Regions A, B, and C, the backfill command may specify a backfill operation to reaggregate the KPI for only Region A. As another example, if the network data anomaly is caused by delayed data from Regions A and B, while the previous iteration of the KPI was aggregated for Regions A, B, and C, the backfill command may specify a backfill operation to reaggregate the KPI for only Regions A and B.

The ADBE 116 and the backfill data processing pipeline 112 thus enable the reaggregation of the KPI to be more region-specific, avoiding the need to reaggregate the KPI on a global level, which may be more computationally intensive than reaggregating the KPI on a regional or multi-regional level. Thus, at least in some cases, an amount of processing time to reaggregate the KPI only for the particular region of the cellular network is less than an amount of processing time to reaggregate the KPI for greater than the particular region (e.g., on a global level).

Figure 2:
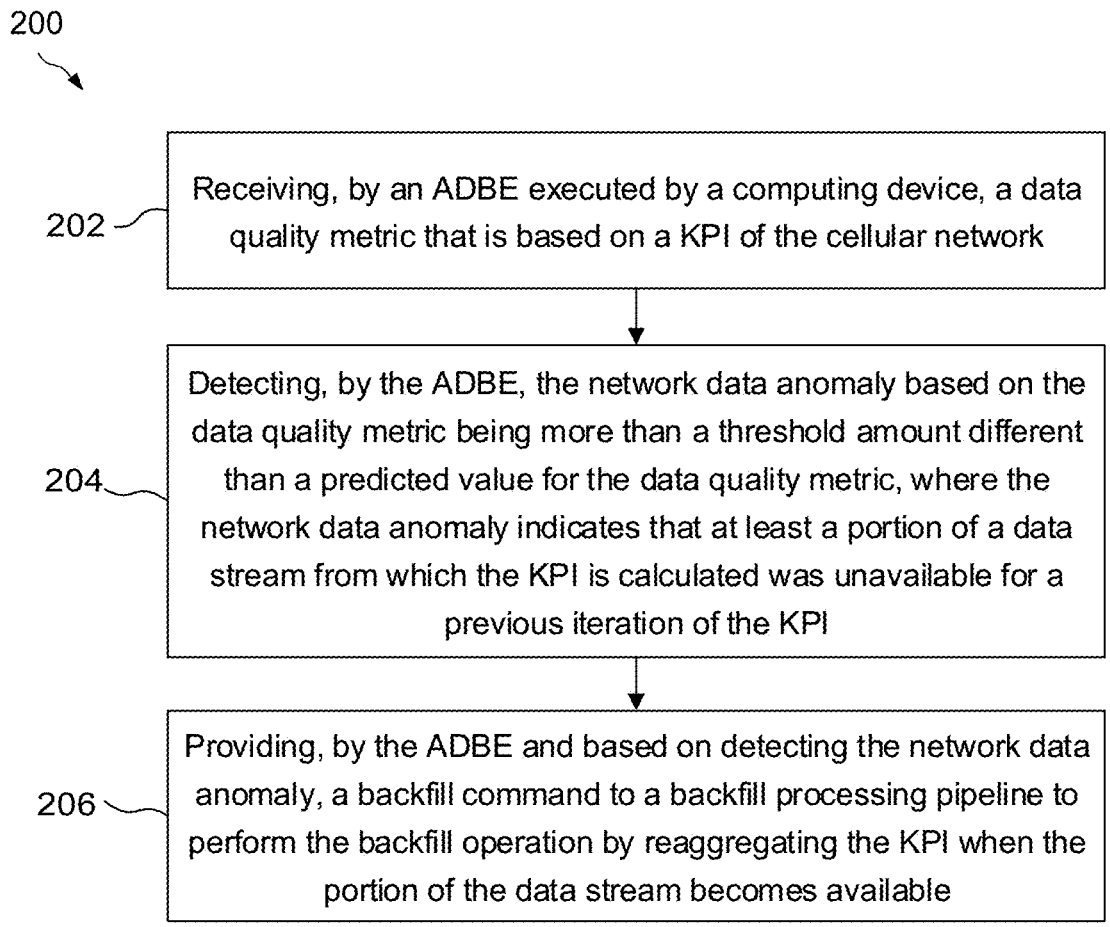
FIG. 2 is a flow chart of a method according to an embodiment of the disclosure.

FIG. 2 is a flow chart of a method 200 in accordance with embodiments of this disclosure. In an embodiment, the method 200 is a method of initiating a KPI backfill operation for a cellular network based on detecting a network data anomaly. The method 200 begins in block 202 with receiving a data quality metric that is based on a KPI of the cellular network. For example, the ADBE 116, which may also be software that is executed by the computing system 118 (or a separate computing device), receives data quality metrics that are based on one or more KPIs in the KPI storage 114. The data quality metrics may be generated by the data processing pipeline 110 and/or the backfill data processing pipeline 112 when aggregating the KPIs, or may be generated by another process (not shown for simplicity) after the KPIs are stored in the KPI storage 114. Irrespective of how the data quality metrics are produced, the data quality metrics are received by the ADBE 116 as described above.

Alternately, although not specifically shown in FIG. 2, instead of receiving the data quality metric in block 202, the method 200 includes receiving a data stream from which a KPI of the cellular network is calculated (e.g., the source network data 108 from one or more OSSes 106 that is used by the data processing pipeline 110 to aggregate KPI(s)).

The method 200 then continues in block 204 with detecting (e.g., by the ADBE 116) the network data anomaly based on the data quality metric being more than a threshold amount different than a predicted value for the data quality metric. As described above, the network data anomaly indicates that at least a portion of a data stream from which the KPI is calculated (e.g., a portion of source network data 108 at the time the KPI is aggregated) was unavailable for that previous iteration of the KPI. The ADBE 116 may include an AI/ML engine, which is trained on historical data quality metric data (e.g., a time series of historical values of the received data quality metric). Thus, the ADBE 116 is configured to detect the network data anomaly in response to a deviation of the received data quality metric from a predicted or expected value for the data quality metric by more than a threshold amount.

Alternately, although not specifically shown in FIG. 2, instead of detecting the network data anomaly based on the data quality metric being more than the threshold amount different than its predicted value in block 204, the method 200 includes detecting the network data anomaly based on a received quantity of the data stream being less than a threshold amount for the data stream.

The method 200 continues further in block 206 by providing a backfill command to a backfill processing pipeline to perform the backfill operation by reaggregating the KPI when the portion of the data stream (e.g., the portion whose delay or unavailability was detected as the network data anomaly in block 204) becomes available. For example, the ADBE 116 provides a backfill command to the backfill data processing pipeline 112. As described above, the backfill data processing pipeline 112 is able to function in parallel with the data processing pipeline 110, so that each may aggregate KPI(s) based on source network data 108 from the OSS(es) 106 at the same time. This enables a backfill operation to be performed in parallel with standard aggregation of KPIs based on current network data from the OSS(es) 106. The backfill command is configured to cause the backfill data processing pipeline 112 to perform a KPI backfill operation by reaggregating the KPI when the portion of the data stream becomes unavailable.

Thus, when a network data anomaly is detected by the ADBE 116, the backfill data processing pipeline 112 is notified by the backfill command, and the ADBE 116 and backfill data processing pipeline 112 work in conjunction to wait for the missing data to arrive (e.g., from the OSS 106), at which point the backfill data processing pipeline 112 reaggregates the KPI that was affected by the detected network data anomaly.

In some embodiments, the method 200 may include other, additional steps that are not specifically shown in FIG. 2 for brevity. For example, the method 200 may also include performing the backfill operation (e.g., by the backfill data processing pipeline 112) by reaggregating the KPI based on receiving the backfill command (e.g., from the ADBE 116). In this case, the KPI is reaggregated including the portion of the data stream that was delayed or otherwise unavailable for the previous iteration of aggregating the KPI.

The method 200 may also include providing (e.g., by the ADBE 116) a notification of the detected network data anomaly, and that a backfill command has been initiated (e.g., irrespective of whether the backfill operation has necessarily begun, and/or is complete), to a downstream KPI consumer 120. The method 200 may further include providing (e.g., by the backfill data processing pipeline 112) a status of the backfill operation to the downstream KPI consumer 120. In this way, the downstream KPI consumer 120 is kept up-to-date and is aware of the fact that the previous iteration of the KPI may be erroneous (e.g., due to being based on delayed and/or unavailable network data), and that a reaggregated iteration of the KPI will be provided once the backfill operation is complete.

Figure 3:
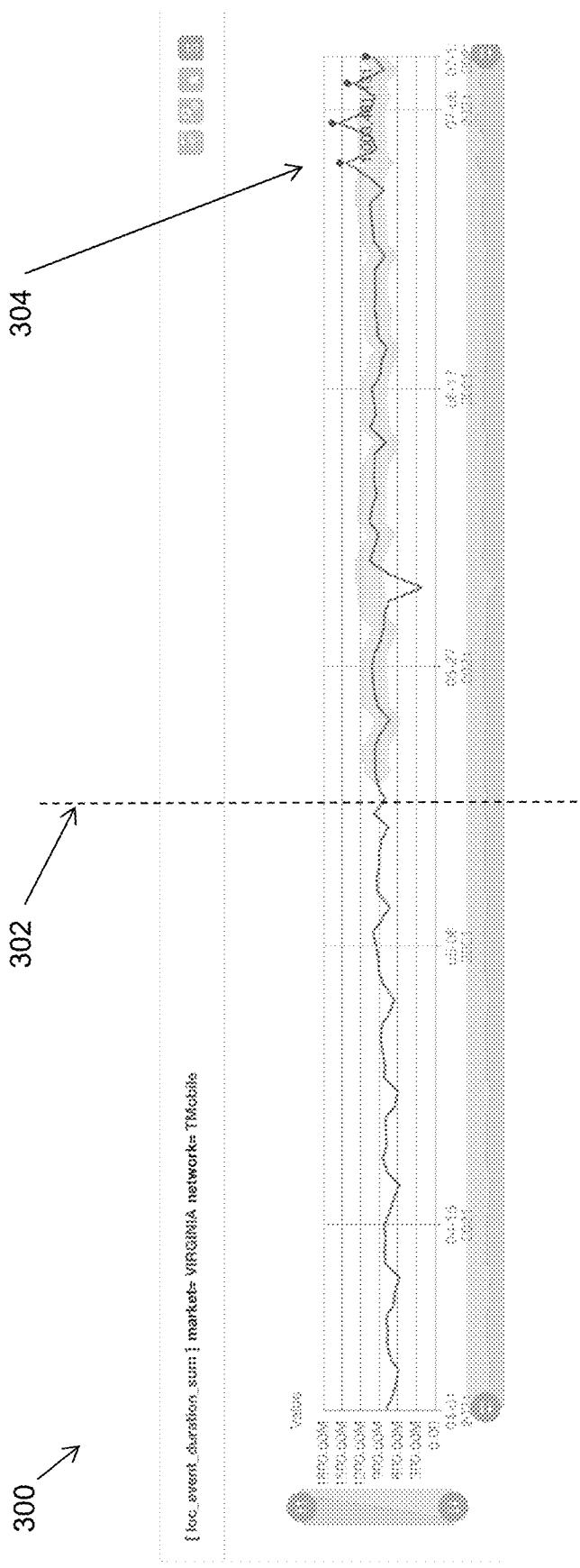
FIG. 3 is a schematic representation of training data for a machine learning engine and resulting predicated values based on the training data.

Turning now to FIG. 3, a graph 300 is shown that includes historical data quality metric data (e.g., a time series of historical values of a particular data quality metric), along with predicted or expected values for that particular data quality metric. As described above, the ADBE 116 may include an AI/ML engine, which may be trained to detect a deviation of the particular data quality metric from a predicted or expected value for that data quality metric by more than a threshold amount. The data in graph 300 prior to time 302 are the historical data, which are based on properly-aggregated values of the particular KPI(s) on which the data quality metric is based. These historical data are provided to the AI/ML engine in order to train the ADBE 116 to detect deviations from a predicted or expected value for that data quality metric. The threshold (e.g., tolerable deviation from predicted or expected value) is shown as a shaded region above and below the predicted or expected value. In some examples, the threshold may be symmetrical (e.g., the positive deviation and negative deviation from the predicted or expected value are equal), while in other examples, the threshold may be asymmetrical around the predicted or expected value.

When the AI/ML engine is sufficiently trained on the historical data until time 302, the ADBE 116 is thus configured to detect the network data anomaly based on the received data quality metric being more than a threshold amount different than the predicted value for that data quality metric. At time 304, the three peaks of the data quality metric represent instances in which the data quality metric differs from the predicted or expected value by more than the threshold amount, illustrated by those peaks at time 304 being outside of the shaded region. The ADBE 116 may identify these peaks as one or more network data anomalies, and handle them as described above with respect to FIGS. 1 and 2.

Figure 4:
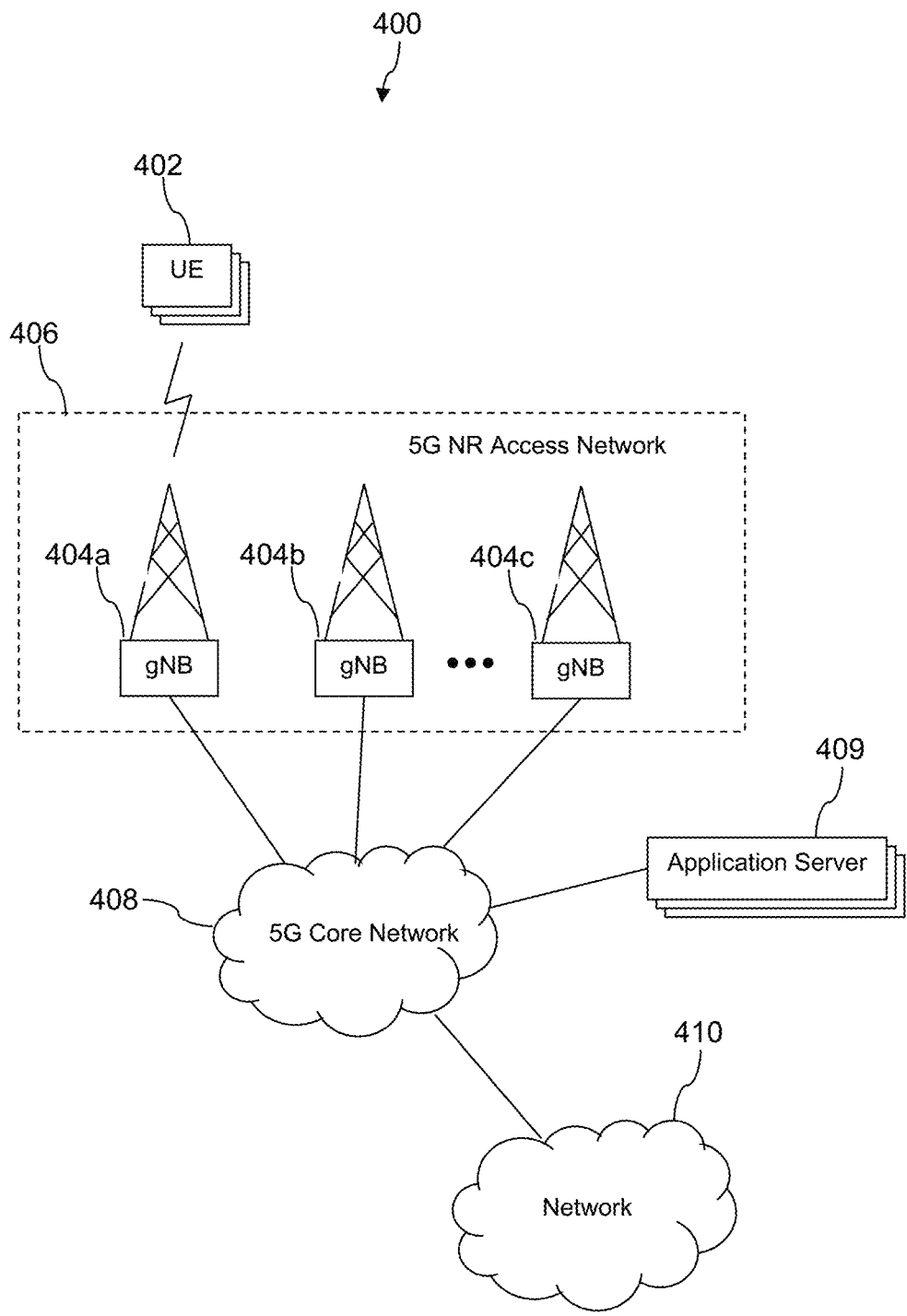
FIG. 4 is a block diagram of a communication system according to an embodiment of the disclosure.

Turning now to FIG. 4, another exemplary communication system 400 is described. Typically the communication system 400 includes a number of access nodes 404 that are configured to provide coverage in which user equipment (UE) 402 such as cell phones, tablet computers, machine-type-communication devices, tracking devices, embedded wireless modules, and/or other wirelessly equipped communication devices (whether or not user operated), can operate. The access nodes 404 may be said to establish an access network 406. The access network 406 may be referred to as a radio access network (RAN) in some contexts. In a 5G technology generation an access node 404 may be referred to as a next Generation Node B (gNB). In 4G technology (e.g., long term evolution (LTE) technology) an access node 404 may be referred to as an evolved Node B (eNB). In 3G technology (e.g., code division multiple access (CDMA) and global system for mobile communication (GSM)) an access node 404 may be referred to as a base transceiver station (BTS) combined with a base station controller (BSC). In some contexts, the access node 404 may be referred to as a cell site or a cell tower. In some implementations, a picocell may provide some of the functionality of an access node 404, albeit with a constrained coverage area. Each of these different embodiments of an access node 404 may be considered to provide roughly similar functions in the different technology generations.

In an embodiment, the access network 406 comprises a first access node 404a, a second access node 404b, and a third access node 404c. It is understood that the access network 406 may include any number of access nodes 404. Further, each access node 404 could be coupled with a core network 408 that provides connectivity with various application servers 409 and/or a network 410. In an embodiment, at least some of the application servers 409 may be located close to the network edge (e.g., geographically close to the UE 402 and the end user) to deliver so-called "edge computing." The network 410 may be one or more private networks, one or more public networks, or a combination thereof. The network 410 may comprise the public switched telephone network (PSTN). The network 410 may comprise the Internet. With this arrangement, a UE 402 within coverage of the access network 406 could engage in air-interface communication with an access node 404 and could thereby communicate via the access node 404 with various application servers and other entities.

The communication system 400 could operate in accordance with a particular radio access technology (RAT), with communications from an access node 404 to UEs 402 defining a downlink or forward link and communications from the UEs 402 to the access node 404 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"— such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 404 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 404 could define an air interface configured in a specific manner to define physical resources for carrying information wirelessly between the access node 404 and UEs 402.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and sub-carrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 402.

In addition, certain resource elements on the example air interface could be reserved for special purposes. For instance, on the downlink, certain resource elements could be reserved to carry synchronization signals that UEs 402 could detect as an indication of the presence of coverage and to establish frame timing, other resource elements could be reserved to carry a reference signal that UEs 402 could measure in order to determine coverage strength, and still other resource elements could be reserved to carry other control signaling such as PRB-scheduling directives and acknowledgement messaging from the access node 404 to served UEs 402. And on the uplink, certain resource elements could be reserved to carry random access signaling from UEs 402 to the access node 404, and other resource elements could be reserved to carry other control signaling such as PRB-scheduling requests and acknowledgement signaling from UEs 402 to the access node 404.

The access node 404, in some instances, may be split functionally into a radio unit (RU), a distributed unit (DU), and a central unit (CU) where each of the RU, DU, and CU have distinctive roles to play in the access network 406. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 5:
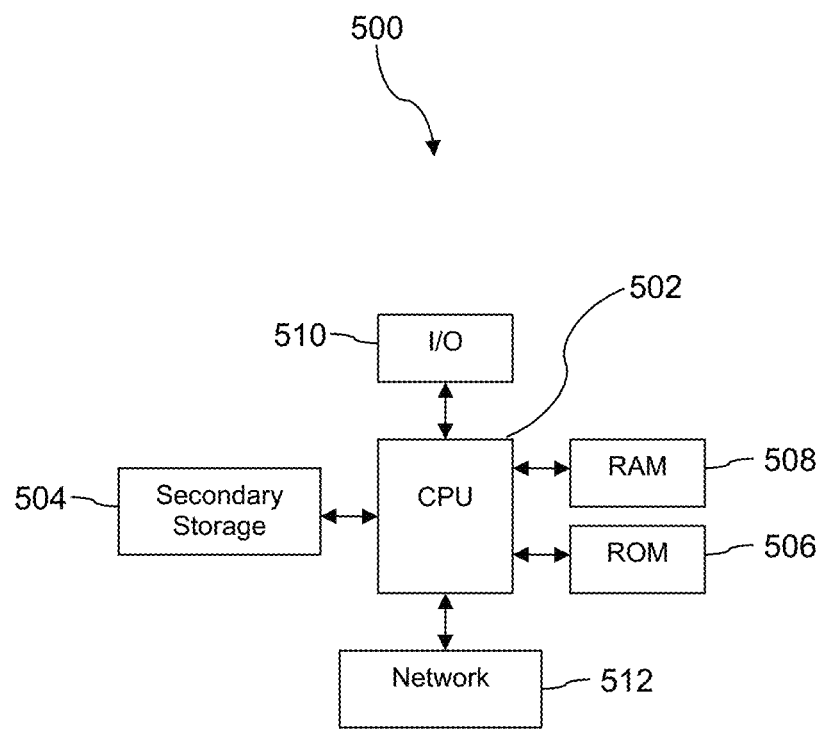
FIG. 5 is a block diagram of a computer system according to an embodiment of the disclosure.

FIG. 5 illustrates a computer system 500 suitable for implementing one or more embodiments disclosed herein. The computer system 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips.

It is understood that by programming and/or loading executable instructions onto the computer system 500, at least one of the CPU 502, the RAM 508, and the ROM 506 are changed, transforming the computer system 500 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 500 is turned on or booted, the CPU 502 may execute a computer program or application. For example, the CPU 502 may execute software or firmware stored in the ROM 506 or stored in the RAM 508. In some cases, on boot and/or when the application is initiated, the CPU 502 may copy the application or portions of the application from the secondary storage 504 to the RAM 508 or to memory space within the CPU 502 itself, and the CPU 502 may then execute instructions that the application is comprised of. In some cases, the CPU 502 may copy the application or portions of the application from memory accessed via the network connectivity devices 512 or via the I/O devices 510 to the RAM 508 or to memory space within the CPU 502, and the CPU 502 may then execute instructions that the application is comprised of. During execution, an application may load instructions into the CPU 502, for example load some of the instructions of the application into a cache of the CPU 502. In some contexts, an application that is executed may be said to configure the CPU 502 to do something, e.g., to configure the CPU 502 to perform the function or functions promoted by the subject application. When the CPU 502 is configured in this way by the application, the CPU 502 becomes a specific purpose computer or a specific purpose machine.

The secondary storage 504 is typically comprised of one or more disk drives or tape drives and is used for non-volatile storage of data and as an over-flow data storage device if RAM 508 is not large enough to hold all working data. Secondary storage 504 may be used to store programs which are loaded into RAM 508 when such programs are selected for execution. The ROM 506 is used to store instructions and perhaps data which are read during program execution. ROM 506 is a non-volatile memory device which typically has a small memory capacity relative to the larger memory capacity of secondary storage 504. The RAM 508 is used to store volatile data and perhaps to store instructions. Access to both ROM 506 and RAM 508 is typically faster than to secondary storage 504. The secondary storage 504, the RAM 508, and/or the ROM 506 may be referred to in some contexts as computer readable storage media and/or non-transitory computer readable media.

I/O devices 510 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 512 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 512 may provide wired communication links and/or wireless communication links (e.g., a first network connectivity device 512 may provide a wired communication link and a second network connectivity device 512 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 512 may enable the processor 502 to communicate with the Internet or one or more intranets. With such a network connection, it is contemplated that the processor 502 might receive information from the network, or might output information to the network in the course of performing the above-described method steps. Such information, which is often represented as a sequence of instructions to be executed using processor 502, may be received from and outputted to the network, for example, in the form of a computer data signal embodied in a carrier wave.

Such information, which may include data or instructions to be executed using processor 502 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 502 executes instructions, codes, computer programs, scripts which it accesses from hard disk, floppy disk, optical disk (these various disk based systems may all be considered secondary storage 504), flash drive, ROM 506, RAM 508, or the network connectivity devices 512. While only one processor 502 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 504, for example, hard drives, floppy disks, optical disks, and/or other device, the ROM 506, and/or the RAM 508 may be referred to in some contexts as non-transitory instructions and/or non-transitory information.

In an embodiment, the computer system 500 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 500 to provide the functionality of a number of servers that is not directly bound to the number of computers in the computer system 500. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 500, at least portions of the contents of the computer program product to the secondary storage 504, to the ROM 506, to the RAM 508, and/or to other non-volatile memory and volatile memory of the computer system 500. The processor 502 may process the executable instructions and/or data structures in part by directly accessing the computer program product, for example by reading from a CD-ROM disk inserted into a disk drive peripheral of the computer system 500. Alternatively, the processor 502 may process the executable instructions and/or data structures by remotely accessing the computer program product, for example by downloading the executable instructions and/or data structures from a remote server through the network connectivity devices 512. The computer program product may comprise instructions that promote the loading and/or copying of data, data structures, files, and/or executable instructions to the secondary storage 504, to the ROM 506, to the RAM 508, and/or to other non-volatile memory and volatile memory of the computer system 500.

In some contexts, the secondary storage 504, the ROM 506, and the RAM 508 may be referred to as a non-transitory computer readable medium or a computer readable storage media. A dynamic RAM embodiment of the RAM 508, likewise, may be referred to as a non-transitory computer readable medium in that while the dynamic RAM receives electrical power and is operated in accordance with its design, for example during a period of time during which the computer system 500 is turned on and operational, the dynamic RAM stores information that is written to it. Similarly, the processor 502 may comprise an internal RAM, an internal ROM, a cache memory, and/or other internal non-transitory storage blocks, sections, or components that may be referred to in some contexts as non-transitory computer readable media or computer readable storage media.

Additional Embodiments

The following are non-limiting specific embodiments in accordance with the present disclosure:

A first embodiment which is a method of initiating a KPI backfill operation for a cellular network based on detecting a network data anomaly that includes receiving, by an anomaly detection and backfill engine (ADBE) executed by a computing device, a data quality metric that is based on a KPI of the cellular network; detecting, by the ADBE, the network data anomaly based on the data quality metric being more than a threshold amount different than a predicted value for the data quality metric, where the network data anomaly indicates that at least a portion of a data stream from which the KPI is calculated was unavailable for a previous iteration of the KPI; and providing, by the ADBE and based on detecting the network data anomaly, a backfill command to a backfill processing pipeline to perform the backfill operation by reaggregating the KPI when the portion of the data stream becomes available.

A second embodiment, which is the method of the first embodiment further comprising performing the backfill operation by reaggregating, by the backfill processing pipeline, the KPI based on receiving the backfill command from the ADBE, wherein the KPI is reaggregated including the portion of the data stream.

A third embodiment, which is the method of the second embodiment, further comprising providing, by the backfill processing pipeline, a status of the backfill operation to a downstream consumer of the KPI.

A fourth embodiment, which is the method of the first embodiment, further comprising providing, by the ADBE, a notification of the detected network data anomaly and the backfill command for the KPI to a downstream consumer of the KPI.

A fifth embodiment, which is the method of the first embodiment, wherein the portion of the data stream that was unavailable for the previous iteration of the KPI is for a particular region of the cellular network, and wherein the backfill command is to perform the backfill operation by reaggregating the KPI only for the particular region of the cellular network.

A sixth embodiment, which is the method of the fifth embodiment, wherein an amount of processing time to reaggregate the KPI only for the particular region of the cellular network is less than an amount of processing time to reaggregate the KPI for greater than the particular region of the cellular network.

A seventh embodiment, which is the method of the first embodiment, wherein the data quality metric comprises a time series of individual data quality metric values.

An eighth embodiment, which is the method of the first embodiment, wherein the data stream comprises one or more selected from a group consisting of call data records (CDR); event data records (EDR); per call measurement data (PCMD); and location session records (LSR).

A ninth embodiment, which is a system for initiating a KPI backfill operation for a cellular network based on detecting a network data anomaly that includes a processor, a non-transitory memory coupled to the processor, and an anomaly detection and backfill engine (ADBE) stored in the non-transitory memory. The ADBE, when executed by the processor, is configured to receive a data stream from which a KPI of the cellular network is calculated; detect the network data anomaly based on a received quantity of the data stream being less than a threshold amount for the data stream, where the network data anomaly indicates that at least a portion of the data stream was unavailable for a previous iteration of the KPI; and provide, based on detecting the network data anomaly, a backfill command to a backfill processing pipeline to perform the backfill operation by reaggregating the KPI when the portion of the data stream becomes available.

A tenth embodiment, which is the system of the ninth embodiment, wherein the backfill processing pipeline is configured to perform the backfill operation by reaggregating the KPI based on receiving the backfill command from the ADBE, wherein the KPI is reaggregated including the portion of the data stream.

An eleventh embodiment, which is the system of the tenth embodiment, wherein the backfill processing pipeline is configured to provide a status of the backfill operation to a downstream consumer of the KPI.

A twelfth embodiment, which is the system of the ninth embodiment, wherein the ADBE is configured to provide a notification of the detected network data anomaly and the backfill command for the KPI to a downstream consumer of the KPI.

A thirteenth embodiment, which is the system of the ninth embodiment, wherein the portion of the data stream that was unavailable for the previous iteration of the KPI is for a particular region of the cellular network, and wherein the backfill command is to perform the backfill operation by reaggregating the KPI only for the particular region of the cellular network.

A fourteenth embodiment, which is the system of the thirteenth embodiment, wherein an amount of processing time to reaggregate the KPI only for the particular region of the cellular network is less than an amount of processing time to reaggregate the KPI for greater than the particular region of the cellular network.

A fifteenth embodiment, which is the system of the ninth embodiment, wherein the data stream comprises a time series of individual data stream values.

A sixteenth embodiment, which is the system of the ninth embodiment, wherein the data stream comprises one or more selected from a group consisting of call data records (CDR); event data records (EDR); per call measurement data (PCMD); and location session records (LSR).

A seventeenth embodiment, which is a non-transitory computer-readable medium that contains instructions that, when executed by a processor of an electronic device, cause the electronic device to be configured to receive a data quality metric that is based on a KPI of a cellular network; detect a network data anomaly based on the data quality metric being more than a threshold amount different than a predicted value for the data quality metric, where the network data anomaly indicates that at least a portion of a data stream from which the KPI is calculated was unavailable for a previous iteration of the KPI; and provide, based on detecting the network data anomaly, a backfill command to a backfill processing pipeline to perform a KPI backfill operation by reaggregating the KPI when the portion of the data stream becomes available.

An eighteenth embodiment, which is the non-transitory computer-readable medium of the seventeenth embodiment, wherein the instructions, when executed by the processor, further cause the electronic device to be configured to provide a notification of the detected network data anomaly and the backfill command for the KPI to a downstream consumer of the KPI.

A nineteenth embodiment, which is the non-transitory computer-readable medium of the seventeenth embodiment, wherein the portion of the data stream that was unavailable for the previous iteration of the KPI is for a particular region of the cellular network, and wherein the backfill command is to perform the backfill operation by reaggregating the KPI only for the particular region of the cellular network.

A twentieth embodiment, which is the non-transitory computer-readable medium of the nineteenth embodiment, wherein an amount of processing time to reaggregate the KPI only for the particular region of the cellular network is less than an amount of processing time to reaggregate the KPI for greater than the particular region of the cellular network.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of initiating a key performance indicator (KPI) backfill operation for a cellular network based on detecting a network data anomaly, the method comprising:
    receiving, by an anomaly detection and backfill engine (ADBE) executed by a computing device, a data quality metric that is based on a KPI of the cellular network;
    detecting, by the ADBE using a machine learning engine of the ADBE, the network data anomaly based on the data quality metric being more than a threshold amount different than a predicted value for the data quality metric, wherein the network data anomaly indicates that at least a portion of a data stream from which the KPI is calculated was unavailable for a previous iteration of the KPI, and wherein the portion of the data stream that was unavailable for the previous iteration of the KPI is for a particular region of the cellular network;
    providing, by the ADBE and based on detecting the network data anomaly, a backfill command to a backfill processing pipeline to perform the backfill operation by reaggregating the KPI when the portion of the data stream becomes available, wherein the backfill command is to perform the backfill operation by reaggregating the KPI only for the particular region of the cellular network, and wherein an amount of processing time to reaggregate the KPI only for the particular region of the cellular network is less than an amount of processing time to reaggregate the KPI for greater than the particular region of the cellular network; and
    monitoring, by the ADBE, multiple data quality metrics including the data quality metric, wherein each of the multiple data quality metrics is compared to its own predicted value.

2. The method of claim 1, further comprising performing the backfill operation by reaggregating, by the backfill processing pipeline, the KPI based on receiving the backfill command from the ADBE, wherein the KPI is reaggregated including the portion of the data stream.

3. The method of claim 2, further comprising providing, by the backfill processing pipeline, a status of the backfill operation to a downstream consumer of the KPI.

4. The method of claim 1, further comprising providing, by the ADBE, a notification of the detected network data anomaly and the backfill command for the KPI to a downstream consumer of the KPI.

5. The method of claim 1, wherein the data quality metric comprises a time series of individual data quality metric values.

6. The method of claim 1, wherein the data stream comprises one or more selected from a group consisting of call data records (CDR); event data records (EDR); per call measurement data (PCMD); and location session records (LSR).

7. A non-transitory computer-readable medium containing instructions that, when executed by a processor of an electronic device, cause the electronic device to be configured to:
receive a data quality metric that is based on a key performance indicator (KPI) of a cellular network;
detect a network data anomaly using a machine learning engine of the electronic device based on the data quality metric being more than a threshold amount different than a predicted value for the data quality metric, wherein the network data anomaly indicates that at least a portion of a data stream from which the KPI is calculated was unavailable for a previous iteration of the KPI and wherein the portion of the data stream that was unavailable for the previous iteration of the KPI is for a particular region of the cellular network;
provide, based on detecting the network data anomaly, a backfill command to a backfill processing pipeline to perform a KPI backfill operation by reaggregating the KPI when the portion of the data stream becomes available, wherein the backfill command is to perform the backfill operation by reaggregating the KPI only for the particular region of the cellular network, and wherein an amount of processing time to reaggregate the KPI only for the particular region of the cellular network is less than an amount of processing time to reaggregate the KPI for greater than the particular region of the cellular network; and
monitor multiple data quality metrics including the data quality metric, wherein each of the multiple data quality metrics is compared to its own predicted value.

8. The non-transitory computer-readable medium of claim 7, wherein the instructions, when executed by the processor, further cause the electronic device to be configured to provide a notification of the detected network data anomaly and the backfill command for the KPI to a downstream consumer of the KPI.

9. The non-transitory computer-readable medium of claim 7, wherein the backfill operation is performed by reaggregating, by the backfill processing pipeline, the KPI based on receiving the backfill command from the electronic device, and wherein the KPI is reaggregated including the portion of the data stream.

10. The non-transitory computer-readable medium of claim 7, wherein the instructions, when executed by the processor, further cause the electronic device to be configured to provide a notification of the detected network data anomaly to a downstream consumer of the KPI.

11. The non-transitory computer-readable medium of claim 7, wherein the data quality metric comprises a time series of individual data quality metric values.

12. The non-transitory computer-readable medium of claim 7, wherein the data stream comprises one or more selected from a group consisting of call data records (CDR); event data records (EDR); per call measurement data (PCMD); and location session records (LSR).

* * * * *